Dec. 8, 1970          T. LOEW          3,546,058
PROTECTIVE PADDING AND METHOD FOR MAKING THE SAME
Filed April 17, 1968
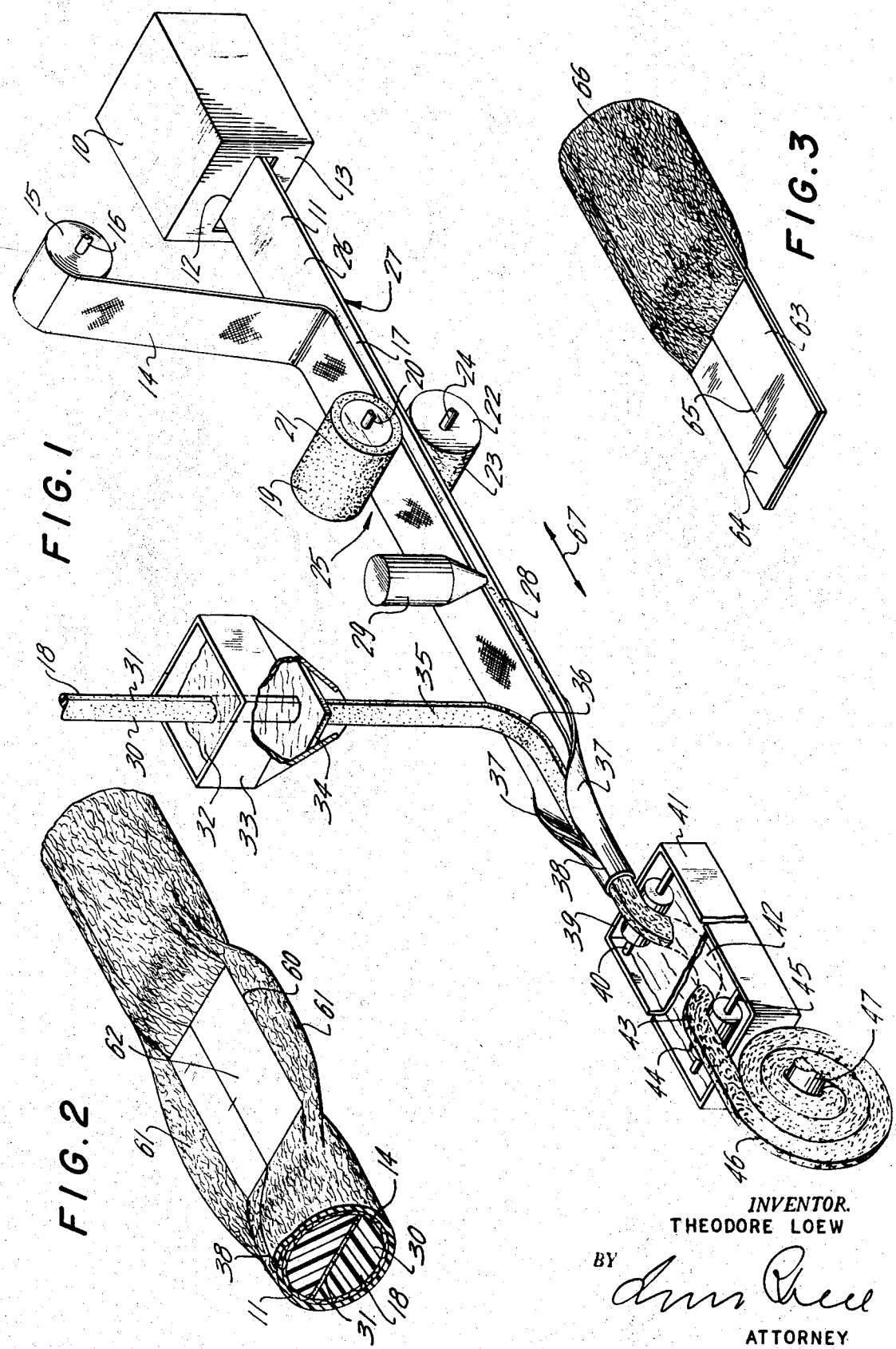
INVENTOR.
THEODORE LOEW
BY
ATTORNEY 3,546,058
PROTECTIVE PADDING AND METHOD
FOR MAKING THE SAME
Theodore Loew, Schenectady, N.Y., assignor, by mesne assignments, to The Standard Products Company, a corporation of Ohio
Filed Apr. 17, 1968, Ser. No. 722,092
Int. Cl. B32b 5/18, 5/24
U.S. Cl. 161—59
9 Claims

ABSTRACT OF THE DISCLOSURE

The disclosure relates to a protective padding consisting of a central core of foam plastic material which is covered by a layer of criss-cross non-woven fabric material, such as scrim, and an outer layer of an embossed decorative extruded sheet vinyl material enwrapping and encasing the same. This material is cut in strips and then sealed at its ends. The padded material may also be attached to the edges of the interior of an automotive vehicle by heat or adhesive connection with edge bindings fitting on suitable connections thereon. Harnesses may readily be made up which will be applicable to the interior of an automotive vehicle for carrying this padding, or protective material or strips.

DESCRIPTION OF THE INVENTION

The present invention relates to the production of protective strips, desirably of plastic material, which may be applied to various articles or members which may be forced into violent contact or cause injury to the body or other objects. Although the invention is particularly applied to the provision of linings or paddings to the interior of automotive vehicles or other conveyances to prevent body injury to drivers or passengers, it also has a broader application to the linings or protective edgings on furniture, large objects in shipping and storage, and boxes, and it is particularly applicable to automobile or vehicle interiors to enhance the safety thereof upon collisions or sudden stoppage.

The invention is also applicable to the method and means by which these protective moldings, edgings or beadings are formed and it also sets forth the harnesses or structures by which these protective linings or edgings may be incorporated with an automobile interior.

It is among the objects of the present invention to provide a protective lining, edging or molding which may be particularly applied to automotive interiors but which is also applicable to furniture, pianos, machinery and appliances to limit the injury either to the body of a person in the vicinity or to the article itself in case of collision or abrupt contact.

It is among the further objects of the invention to provide a simple, inexpensive, economical manner of forming padding or protective strips which will permit cutting off of these strips or the shaping of them to desired conformation so that they may be readily attached or associated with automotive interiors of other articles where it is desirable to protect edges or relatively stiff members against too violent collision or contact.

Another object is to provide a novel harness construction which readily lends itself to the attachment or plastic strips, paddings or protective elements, and also enables these to be readily mounted inside of an automotive vehicle.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to first provide an expanded resinous core, which, although desirably of cylindrical shape, may also be of various other cross-sectional forms, such as rectangular, triangular or the like. This may be formed by causing a foam of a plastic material to be produced. This plastic material in foam or expanded form should desirably be relatively strong, coherent and highly porous but non-permeable and very adherent.

The core may be made of several sections which are adhesively or heat connected together. This core is then coated with an adhesive and then wrapped in an extruded or rolled or cut strip of vinyl or other thermal plastic sheet material which is adhesively connected to it and wrapped around it with a slight overlap. It has been found desirable to position between the outer vinyl sheet wrapping and the inner foam or expanded core a non-woven fabric material, preferably a scrim of short glass or nylon fibers, which will reenforce the same. This scrim may be pressed into the vinyl strip or sheet material incidentally to extrusion and before chilling.

After this wrapping has been completed, the entire assembly is desirably chilled and then coiled, ready for subsequent usage. The coiled material is then divided in lengths by means of electronic sealing applications or heat sealing applications, which will compress and collapse the assembled covered foam material and seal the end of the tubular structure so that there are flat attachment edges. These wrapped beadings or strippings may then be assembled on to suitable framing members to enable their attachment to irregular interiors of automotive vehicles.

These frames or harnesses may consist of U-shaped edge bindings or clip bindings fitting on the metal angles of the automotive interior.

BRIEF DESCRIPTION OF THE DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top perspective view showing one manner of forming the protective stripping.

FIG. 2 is a fragmentary perspective view indicating the method of sealing sections of the edge protective stripping of FIG. 1 before cutting the same into strips.

FIG. 3 is a fragmentary end perspective view showing the cut end of the stripping, according to FIG. 2.

Referring to FIG. 1, there is shown a container A within which may be positioned a supply of particles of a thermoplastic resinous material, such as vinyl chloride or vinyl chloride acetate, in an intermediate state of polymerization having a molecular size of about 20,000 to 50,000, which is heated to a temperature much in excess of 300 to 400° so as to place the particles in a state of incipient fusion. Then, under pressure of a piston or screw expeller, the sheet of plastic material 11 is extruded through the slot 12 in the face 13 of the vessel 10. The extruded material, while still hot, is combined with a non-woven fabric having criss-crossed interlaced fibers of either nylon or glass or other similar materials, indicated at 14.

This scrim 14 is supplied from the roll 15 on the axis 16. The scrim 14 is narrower than the width of the extruded strip 11 so that there will be a margin 17 to form an overlap and permitting the combined scrim and extruded plastic material 11 to be overlapped after it has been wrapped around the foamed or expanded core 18, which may also be of vinyl polymer material. The scrim 14 is pressed into the vinyl strip or sheet 11 by means of the upper pressure roller 19 turning on the axis 20 and having a suitable abraded facing 21.

The lower pressure roller 22 may carry a decorative facing or embossing 23 and it turns on the shaft 24. These two rollers pressing together at the point 25 will press the scrim 14 into the upper face 26 of the extruded strip 11 and will also decorate the underface 27. The combined scrim 14 and extruded plastic sheet 11 with the margin 17 projecting are then passed beyond the rollers 19 and 22 and the margin picks up at 28 an adhesive from the adhesive supply 29.

In the meanwhile, the foamed or expanded core 18, which may consist of two semi-cylindrical sections 30 sealed together at their flat sides at 31, passes downwardly into the adhesive 32 in the container 33. The dam 34 may be formed to provide an even cutting of the adhesive over the entire surface area 35 of the core 18. This core 18 will be deposited at 36 in the middle of the combined scrim and extruded plastic 11, which is then folded over, as indicated at 37, with an overlap at 38, and it is then passed over the roller 39 on the shaft 40 and the cold water container 41.

This wrapped core then passes a considerable distance 42 to chill the extruded material or wrapper 11, and it may be caused to pass under a number of similar rollers, as indicated at 39, which are not shown. After it has been thoroughly chilled and set, the material then passes outwardly as indicated at 43 over the roller 44 and the shaft 45. The wrapped core material is then wrapped up as indicated at 46 upon the roller 47, then may be processed and cut in strips, depending upon the lengths that are desirable.

As shown in FIG. 2, the cross-section interiorly will have a core 18 consisting of two semi-cylindrical half sections 30, joined by the adhesive 131 to form a cylinder. Wrapped around the core 18 will be the scrim 14. Outside of the scrim 14 will be the extruded vinyl strip 13, which has been wrapped around and overlapped at 38. To divide the material in lengths, it is compressed and collapsed as indicated at 60 by means of a heating iron or electronic sealing device, with the result that the sides will be pressed out as indicated at 61 and the center part will be flattened at 62.

The strip is then cut through the middle of the flattened portion 62 and the sides 61 are trimmed off, leaving the end 63, in which the wrapping 11 will have been flattened as indicated at 64, with the overlap being at 65. The main body 66 may be suitably attached by means of adhesive or heat to a harness frame or edge that is to be protected. The adhesive may consist of various types of liquid vinyl lacquer, which desirably is in a lower state of polymerization than the extruded material.

The extruded material is desirably formed so that the tension of forming will extend longitudinally of the strip, as indicated by the direction 67. The temperature of extrusion should be in excess of 250° and desirably in the range of 300 to 400° F., which temperature is substantially retained until it is chilled by the water bath in 41, which will retain the longitudinal strain indicated at 67 therein. The injection pressure should vary between 1,500 to 10,000 pounds per square inch and desirably have an average of 3,000 pounds per square inch.

Although polyurethane foam may also be employed, a vinyl plastisol foam has been found most satisfactory. the facing of the roller 21 may be of rubber material, but where a design is desired on the face of the wrapped material, the facing 23 desirably consists of embossed metal. The vinyl adhesive, as indicated at 28 and 32, is desirably of a low molecular weight vinyl material in a suitable solvent, such as isobutyl ketone or cyclohexone. The blade, which compresses and flattens and destroys the foam at the position 62 in FIG. 2, desirably applies a temperature of 300 to 350° F.

The vinyl plastisol resin which is used to make the core 18 desirably has about 100 parts of vinyl resin, 85 parts of plastisol, and 5 parts of a barium cadmium stabilizer.

As many changes could be made in the above manufacture of protective paddings and methods and means for making the same, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A wrapped thermoplastic elongated protective compressible porous material for application to automotive interiors and other parts, corners and edges of appliances, furniture, rooms and the like for protection against collision and injury comprising a foam thermoplastic core, an inside wrapping of a thin fibrous material around said core, an outside wrapping of a thermoplastic sheet material overlapped at one side thereof, said wrappings and overlap being sealed together by a thermoplastic adhesive material.

2. The material of claim 1, said thermoplastic material consisting of a polymerized vinyl chloride and said core consisting of a foamed and expanded vinyl material.

3. The material of claim 1, said core consisting of half-cylinders of foamed and expanded vinyl sealed together by an adhesive material to form a cylinder core.

4. The material of claim 1, said core being coated with an adhesive material and having said inside and outside wrappings compressed together before wrapping around said core.

5. The material of claim 1, said inner wrapping consisting of a non-woven scrim fabric consisting of fibers diagonally laid against one another and diagonal to the longitudinal axes of the material and said fibrous material being embodied into the outer wrapping and said outer wrapping consisting of a hot extruded sheet of vinyl plastic.

6. A method of making the material of claim 1 which comprises hot extruding the outside wrapping, compressing the inside wrapping into the inside face of the outside wrapping while in hot condition, applying a decorative effect to the outside face of the outside wrapping while in hot condition, causing said outside wrapping to be wider than the inside wrapping to leave a margin, applying adhesive to the inside face of the margin, supplying the foam core with an adhesive surfacing thereon and then wrapping the combined inside and outside wrappings to the core and chilling it.

7. The method of claim 6, said material being cut in lengths by applying a compression thereto to collapse the foam and then cutting through the compressed portion.

8. The method of claim 6, the temperature of extrusion being between 350 and 400° F. and all steps taking place while the extruded strip forming the outside wrapping is in hot condition and then chilling when the assembly has been completed.

9. The method of claim 6, said material being cut in lengths by applying a compression thereto to collapse the foam and then cutting through the compressed portion and then chilling by passing through cold water.

References Cited

UNITED STATES PATENTS

| | | | |
|---|---|---|---|
| 2,962,406 | 11/1960 | Rosa | 161—160X |
| 2,963,716 | 12/1960 | Norehad | 161—107X |
| 2,980,570 | 4/1961 | Cook et al. | 161—107 |
| 3,219,333 | 11/1965 | Derschmidt et al. | 161—43X |
| 3,226,284 | 12/1965 | Curtis | 161—44 |
| 3,400,040 | 9/1968 | Osgood | 161—104 |
| 3,401,071 | 9/1968 | Cleereman et al. | 156—244 |

WILLIAM J. VAN BALEN, Primary Examiner

W. A. POWELL, Assistant Examiner

U.S. Cl. X.R.

156—177, 201, 204, 209, 213, 215, 227, 244, 250, 468, 475; 161—101, 107, 124, 160, 175, 178, 179, 180